United States Patent [19]

Suzuki et al.

[11] Patent Number: 4,863,805

[45] Date of Patent: Sep. 5, 1989

[54] RARE EARTH-IRON MAGNET

[75] Inventors: Teruo Suzuki; Matsuo Kishi; Katsuyoshi Muraishi; Kenichi Ogawa; Hiroshi Takashio, all of Tokyo, Japan

[73] Assignee: Seiko Instruments Inc., Tokyo, Japan

[21] Appl. No.: 59,737

[22] Filed: Jun. 8, 1987

[30] Foreign Application Priority Data

| Jun. 6, 1986 [JP] | Japan | 61-131488 |
| Jun. 6, 1986 [JP] | Japan | 61-131487 |
| Jul. 1, 1986 [JP] | Japan | 61-154456 |
| Jul. 2, 1986 [JP] | Japan | 61-155751 |

[51] Int. Cl.$^4$ .................................... C22C 38/00
[52] U.S. Cl. ................... 428/558; 252/62.53; 252/62.54; 75/244; 148/105
[58] Field of Search ........... 428/556, 558; 75/231, 75/244; 148/105; 252/62.53, 62.54

[56] References Cited

U.S. PATENT DOCUMENTS

| 3,892,599 | 7/1975 | Smeggil et al. | 148/105 |
| 3,892,600 | 7/1975 | Smeggil et al. | 148/105 |
| 3,892,601 | 7/1975 | Smeggil et al. | 148/105 |
| 3,998,669 | 12/1976 | Strnat | 428/558 |
| 4,063,971 | 12/1977 | Greinacher et al. | 148/105 |
| 4,289,549 | 9/1981 | Kasai | 252/62.54 |
| 4,626,371 | 12/1986 | Ikenaga et al. | 352/62.54 |
| 4,684,406 | 8/1987 | Matsuura et al. | 148/105 |
| 4,689,163 | 8/1987 | Yamashita et al. | 252/62.54 |
| 4,734,131 | 3/1988 | Arai et al. | 75/244 |

Primary Examiner—Stephen J. Lechert, Jr.
Assistant Examiner—Eric Jorgensen
Attorney, Agent, or Firm—Bruce L. Adams; Van C. Wilks

[57] ABSTRACT

A rare earth-iron permanent magnet is comprised of compacted Re-B-R type alloy particles in which R represents at least one element selected from rare earth elements and yttrium. The magnet has a sealing agent filling voids between the compacted Fe-B-R type alloy particles and a coating layer formed on outer surfaces thereof. The coating layer is formed by coating the surfaces wrought in a desired magnet shape.

24 Claims, 1 Drawing Sheet

RARE EARTH-IRON MAGNET

BACKGROUND OF THE INVENTION

1. Field of the Invention

This invention relates to an improved permanent magnet and more particularly to a corrosionproofing treatment for rare earth-iron magnet.

2. Description of the Prior Art

A Sm-Co base magnet has been conventionally used as a high energy product magnet. However, a rare earth-iron base magnet has recently attracted attention because of its low cost, good mechanical processing and higher energy product. Particularly, a magnet having a composition comprising, in terms of atomic %, 8 to 30% R (wherein R is at least one rare earth element including yttrium), 2 to 28% boron with the balance being iron and unavoidable impurities, or 8 to 30% R, 2 to 28% B, more than zero and not exceeding 50% Co, and the balance being Fe with impurities is effective.

About the above rare earth-iron magnets are disclosed in EP No. 101 552 A2 and EP No. 106 948 A2.

However, the rare earth-iron base magnets is inferior in corrosion and chemical resistance to the one based on Sm-Co, which requires the treatment of the surface thereof. In fact, an attempt has been made to treat the surface with aluminium chromate.

SUMMARY OF THE INVENTION

The rare earth-iron base magnet produced by the sintering process is poor in corrosion and chemical resistance, particularly poor in acid and alkali resistance because of the fact that iron is contained therein as a main component. Further, the magnet has a number of voids therein.

Therefore, when a wet treatment is conducted for corrosion protection, a chemical for treatment enters the voids of the inside of the magnets and stays there, which brings about the occurrence of corrosion of the inside of the magnet and blistering of the surface coating layer.

For example, in the surface treatment such as wet plating, the surface is attacked during pretreatment with acid, alkali or the like, or during plating. Even when the plating is successfully conducted, there occurs internal corrosion and erosion of the void portion among the grains due to an adverse effect of the chemical which has penetrated into the inside. The occurrence of the abovementioned corrosion leads to the deterioration of the magnetic characteristics. For example, in the case of a rotor magnet for a step motor of a watch, the magnetic characteristics are lowered by about 10% in an early stage as compared with an untreated magnet, and are further lowered with the lapse of time. At the same time, there is caused a problem that the characteristics with respect to mechanical strength are also lowered.

It is an object of the invention to provide a rare earth-iron magnet comprising Fe, B and R, or Fe, Co, B and R wherein R is at least one rare earth element including Y, which is excellent in corrosion resistance, magnetic stability and mechanical strength.

According to the present invention, there is provided a rare earth-iron magnet, more particularly a sintered rare earth-iron magnet comprising a sealing agent filling the voids among the grains of the magnet and a coating, such as a plating layer, organic coating or plasma-polymerized coating, covering the entire surface of the magnet.

The above object and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE INVENTION

As previously noted, the present invention involves an improved treatment of the surface of a rare earth-iron magnet.

In the present invention, the voids among the grains of the magnet is filled with a sealing agent and the entire surface of the magnet is formed of a coating layer, such as a plating layer, organic coating, organic polymer coating or metal-Organic polymer composite coating.

Figure 1:
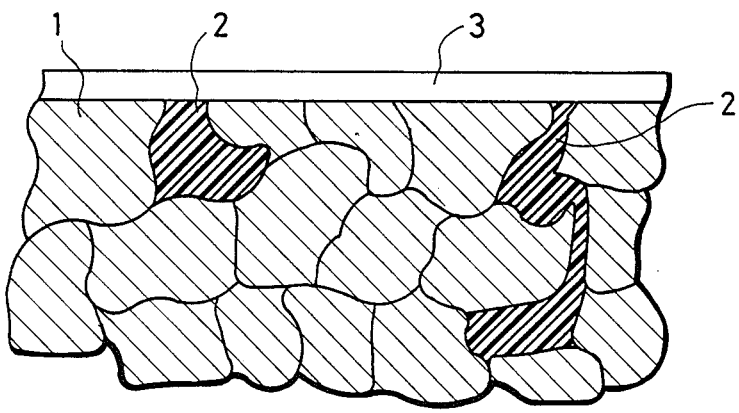
FIG. 1 is a partial sectional view of a magnet embodying the invention.

FIG. 1 is a partial sectional view of an embodiment of the invention.

In FIG. 1, the numeral 1 indicates a sintered rare earth-iron magnet. The magnet produced by sintering has void portions among the gains of the magnet. These void portions are filled with a sealing agent 2.

Examples of the sealing agent include linseed oil, wax, water glass, polyester, resin, phenolic resin, epoxy resin, and anaerobic resin. The sealing agent is poured into the void portion in a liquid state and then cured.

The surface of the magnet is formed of a coating layer 3.

The invention is illustrated in more detail by the following non-limiting examples:

EXAMPLE 1

As starting materials, electrolytic iron, boron and neodium of which purity is 99.5% or more were used. The materials were melted by high-frequency melting and then casted by water-cooled copper mold. As a result, an ingot composing 16Nd-8B-76Fe was produced.

Next, the ingot was ground into pieces by a stamp mill and a ball mill, so that powder of which fine grit size is 3–10 micron was obtained. The powder was put into a metal mold, oriented in a magnetic field of 15KOe, and molded by the pressure of 1.5 t/cm$^1$ in parallel with the magnetic field. The molded product was sintered at 1100° C. for 1 hour in Ar gas and allowed to cool. Further, age processing was conducted at 600° C. for 1 hour. Thus, a permanent magnet was obtained.

The permanent magnet obtained was cut down into pieces of which sizes are 20 m/m × 10 m/m × 5 m/m. Then, grease was removed from the pieces by an organic solvent. Subsequently, the minute voids in the magnet pieces were filled by a pressure reducing method. In order to fill the voids, the above pieces were soaked in a vessel for pressure reduction in which anaerobic adhesive solvent was provided, and left there with the pressure reduced (1 Torr) for 3 minutes. Then, the pressure was reset to the air pressure. Consequently, the voids were filled. The unhardened anaerobic adhesive solvent which is attached to the surface of the pieces were degreased by alkali and cleaned by acid. Subsequently, various kind of plating were conducted under the conditions shown in Table 1. Then, the corrosion resistance, adhesion and magnetic characteristics after plating were evaluated. The result is shown in Table 2.

The corrosion resistance is evaluated by the appearance of the sample pieces placed in a room of 60° C. and 90% relative humidity for 240 hours. The adhesion is evaluated by conducting a pulling test by means of adhesive tapes and checking if a thin film layer on the surface is peeled off. In Table 1, the electroless plating sample were prepared by the well-known activating in tin(II) chloride and paradium chloride solutions as a sensibility treatment.

The unplated sample having the same element as that of the sample of the present invention undergoes the evaluation on the corrosion resistance and magnetic characteristics in the same method as the above. Also, the result is shown in Table 2 for comparison.

TABLE 1

| sample | kind of plating and the thickness of plating | plating bath | current density | bath temp. (°C.) | time (minutes) |
|---|---|---|---|---|---|
| 1-1 | Cu plating 3μ | electroless copper plating bath | — | 20 | 20 |
| 1-2 | Cu plating 5μ | electroless copper plating bath | — | 20 | 30 |
| 2-1 | Cu plating 3μ | copper cyanide plating bath | 2A/dm² | 35 | 6 |
| 2-2 | Cu Plating 5μ | copper cyanide plating bath | 2A/dm² | 35 | 10 |
| 3-1 | Ni-p plating 3μ | electroless nickel plating bath | — | 90 | 9 |
| 3-2 | Ni-p plating 5μ | electroless nickel plating bath | — | 90 | 15 |
| 4-1 | Ni plating 3μ | nickel plating (watt bath) | 2A/dm² | 60 | 9 |
| 4-2 | Ni plating 5μ | nickel plating (watt bath) | 2A/dm² | 60 | 15 |
| 5-1 | Cu plating 5μ as under layer + Ni plating 1μ | electroless copper plating bath / nickel plating (watt bath) | — / 2A/dm² | 20 / 60 | 30 / 3 |
| 5-2 | Cu plating 5μ as under layer + Ni plating 1μ | copper cyanide plating bath / nickel plating (watt bath) | 2A/dm² / 2A/dm² | 20 / 60 | 10 / 3 |

TABLE 2

| | sample | corrosion resistance | adhesion characteristics | magnetic characteristics | | |
|---|---|---|---|---|---|---|
| | | | | Br | iHc | (BH)max |
| comparison data | unplated | X | — | 100 | 100 | 100 |
| present invention | 1-1 | ○ | ⊙ | 99 | 98 | 98 |
| | 1-2 | ○ | ⊙ | 98 | 99 | 98 |
| | 2-1 | ○ | ⊙ | 99 | 99 | 99 |
| | 2-2 | ○ | ⊙ | 98 | 98 | 99 |
| | 3-1 | ⊙ | ⊙ | 99 | 98 | 99 |
| | 3-2 | ⊙ | ⊙ | 99 | 99 | 98 |
| | 4-1 | ⊙ | ⊙ | 98 | 99 | 99 |
| | 4-2 | ⊙ | ⊙ | 98 | 98 | 99 |
| | 5-1 | ⊙ | ⊙ | 99 | 99 | 98 |
| | 5-2 | ⊙ | ⊙ | 99 | 99 | 98 |

X Indicates that a remarkable red rust is generated.
○ Indicates that a change of color is hardly generated.
⊙ Indicates that a change of color is not generated at all.

As is obvious from Table 2, the unplated sample generates remarkable red rust on the surface of the magnet pieces as a result of testing the corrosion resistance. On the other hand, the permanent magnet of the present invention presents sufficient corrosion resistance. Moreover, the surface processing hardly causes a change in the magnetic characteristics. That is, the present invention attains to produce a NdFe magnet having excellent reliability.

EXAMPLE 2

A rotor of a step motor for a watch, which was prepared from a sintered Nd-Fe-B base magnet, was cleaned through washing with trichloroethylene. Subsequently, the rotor was immersed in an anaerobic adhesive solvent of which the viscosity is adjusted to 10 cp.

The rotor immersed in the anaerobic adhesive is placed in a vacuum container (1 Torr) and is allowed to stand in it for 5 min. followed by returning the pressure of the vacuum container to the atmospheric pressure. Thus, the anaerobic adhesive penetrated the voids among the grains of the inside of the rotor and was cured. Thereafter, the anaerobic adhesive remaining uncured was dissolved and washed away with alcohol. A 5 μm-thick organic coating layer comprising poly-p-xylene was formed on the surface of the rotor by the vacuum deposition method, to thereby obtain a final product. The rotor for electronic watches thus obtained was allowed to stand in a thermo-hygrostatic atmosphere kept at a temperature of 40° C. and a relative humidity of 95% for 200 hr. As a result, it was found that the rotor caused neither rusting nor discoloration and had a satisfactory quality for use as a rotor for electronic watches.

The rare earth-iron base magnet thus obtained completely prevents the penetration of chemicals, water, etc. thereinto from the outside by virtue of the filling of the voids among the grains with a sealing agent and, at the same time, prevents discoloration and rusting by virtue of the presence of the organic film layer on the surface thereof.

According to the present embodiment, the same effect can be also attained with respect to rare earth-iron base magnets other than those described in the above example.

Further, with respect to the sealing agent, linseed oil, wax, varnish, water glass, polyester resin, phenolic resin, epoxy resin, etc. can be also employed besides the anaerobic adhesive. Moreover, the organic coating can be also formed using a coating agent such as fluororesin.

The another embodiments are as follows.

In another embodiment of the present invention, the surface of a magnet is formed of a sealing agent filling the voids among the grains of the magnet and a plasma-polymerized coating, such as an organic polymer coating or metal-organic polymer composite coating, covering the entire surface of the magnet. The present invention remarkably enhances the corrosion resistance and long-term stability of magnetic characteristics through a combination of pinhole-freeness of the plasma polymerized coating derived from its high denseness with an effect of filling the void portions among the grains.

In the formation of a coating by plasma polymerization, a coating having a dense network structure can be formed through a complicated combination of a process of forming an intermediate of a polymer in a gas phase from a monomer and depositing the intermediate on a substrate to form a polymer coating thereon, a process of polymerizing a monomer, dimer or trimer adsorbed on the surface of a substrate through activation by means of a plasma, with a process of eliminating the formed polymer by means of etching. Therefore, the formed coating is free from pinholes despite the small thickness and, at the same time, is excellent in wear and chemical resistances. Further, since the coating is formed in a gas phase, the formed polymer can be well applied even onto tiny voids. Moreover, a metal-polymer composite coating can be formed by vaporizing a metal when the plasma polymerization is conducted, which enables further improvement in wear resistance. In the present invention, the corrosion resistance, magnetic stability and mechanical strength of the magnet are improved through a combination of the above-mentioned formation of a polymer coating with the treatment for filling the voids among magnet grains, in which a plasma-polymerized coating is formed only with difficulty, with a sealing agent.

The above described embodiments will now be described in more detail with reference to the following examples 3 and 4.

EXAMPLE 3

A rotor of a step motor for a watch, which was prepared from a sintered Nd-Fe-B base magnet was cleansed through with a solvent etc. The rotor was then immersed in an anaerobic resin comprising an acrylic ester, of which the viscosity was adjusted to 10 cp, under a degree of vacuum of 1 Torr for 5 min. The rotor was taken out in air and allowed to stand, thereby curing the resin present in the voids among the grains of the magnet. The uncured resin present on the surface of the magnet was removed with an alcohol. An argon gas and a methyl acrylate monomer were fed using a plasma polymerization device of the internal electrode type. A plasma was generated under $3 \times 10^{-1}$ Torr with a high-frequency power source of 13.56 MHz to conduct plasma polymerization, thereby forming a 0.5 μm-thick polymethyl acrylate coating.

The rotor thus formed was entirely coated, including the voids among the grains, with the anaerobic resin and polymethyl acrylate coating. In a thermohygrostatic test conducted at a temperature of 40° C. and a relative humidity of 95% for 100 hr, the rotor exhibited an excellent corrosion resistance without occurrence of corrosion and also exhibited a remarkably excellent long-term stability without causing the lowering in mechanical strength and magnetic characteristics.

EXAMPLE 4

A sintered Nd-Fe-B base magnet was filled with a sealing agent. A high-frequency ion plating device was evacuated to $5 \times 10^{-5}$ Torr. An argon gas was fed to conduct an ion bombardment. Ethylene monomer was fed, and a plasma polymerization was then conducted under a pressure of $1 \times 10^{-3}$ Torr by applying a high-frequency electric power of 13.56 MHz at 100 W while evaporating aluminum through resistance heating, thereby forming a 0.4 μm-thick aluminum-polyester composite polymer coating in which aluminum was uniformly distributed in a polyester polymer coating.

The magnet thus obtained was excellent in corrosion resistance, magnetic stability and mechanical strength like the magnet obtained in EXAMPLE 3. Further, the magnet had an enhanced coating strength and an excellent wear resistance by virtue of the compounding of aluminum.

The further embodiments are as follows. In a further embodiment of the present invention, a magnet having an excellent corrosion resistance is provided by filling the voids present in the inside of a magnet produced by sintering with a sealing agent, coating the surface thereof with a coating layer such as plating layer and filling the defective portion of the resulting coating layer and the voids present in the inside of the magnet again with the sealing agent, thereby shielding the magnet material from a corrosive atmosphere.

That is, a magnet produced by sintering was subjected to a treatment comprising filling the voids present in the inside of the magnet with a sealing agent by vacuum impregnation or the like, coating the surface of the magnet with a coating layer by wet plating, dry plating or the like and filling the defective portion of the coating layer and void portion present in the inside of the magnet again with the sealing agent.

The above-mentioned treatment serves to shield the voids in the inside of the magnet, formed during the production of the magnet, from the outside corrosive atmosphere and chemicals used in the subsequent steps of treatment by virtue of the initial filling of the voids with sealing agent and, therefore, prevents the occurrence of corrosion.

The coating layer shields the surface of the magnet from the outside corrosive atmosphere and, therefore, prevents the occurrence of corrosion.

Further, the voids of the magnet newly produced during formation of the coating layer made of a sealing agent on the surface of the magnet as well as defective portions of the resulting coating layer are shielded from the outside corrosive atmosphere by the second filling of the sealing agent, which prevents the occurrence of corrosion.

It is needless to say that the voids produced during the production of the magnet and independently existing without communicating with the surface of the magnet are free from the occurrence of corrosion even when they are not filled with the sealing agent according to the present embodiment, because they are not exposed to the chemicals used in the formation of the coating and the outside corrosive atmosphere.

The further embodiment will now be described in more detail with reference to FIG. 2 and the following examples 5 and 6.

Figure 2:
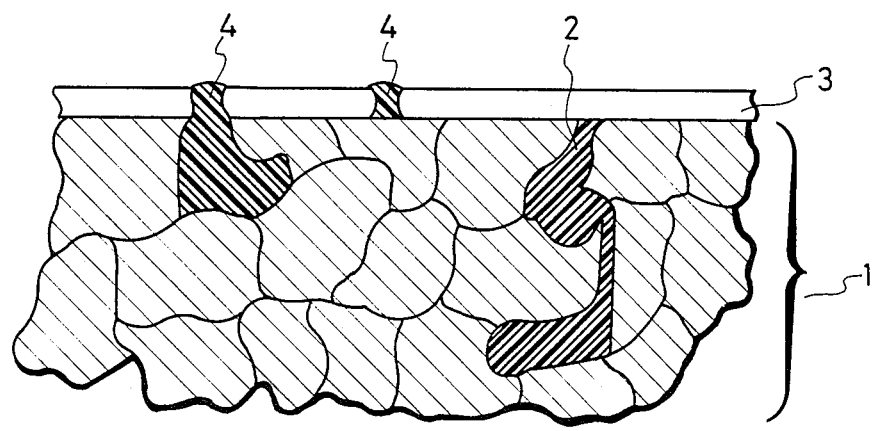
FIG. 2 is a partial sectional view of another embodiment of the invention.

The partial sectional view of further embodiment is shown in FIG. 2. Referring to FIG. 2, numeral 4 is a sealing agent packed, after coating layer 3 composed of plating layer, organic coating or plasma-polymerized coating, into defective portion of the coating layer and the voids present in the inside of the magnet. The reference numerals 1 and 2 indicate a magnet produced by sintering and a sealing agent packed, prior to the coating, into the voids present in the inside of the magnet.

EXAMPLE 5

A Nd-B-Fe base magnet produced by sintering was impregnated in vacuo with a sealing agent comprised mainly of an acrylic ester and was allowed to stand at room temperature for 10 min. The uncured resin present on the surface thereof was removed by dissolving with an organic solvent.

Then, the surface of the magnet was sufficiently washed and activated, followed by the formation of an electroless copper plating in a thickness of 5 μm. Subsequently, an electroless nickel plating was formed thereon in a thickness of 2 μm.

Finally, the magnet was impregnated in vacuo again with a sealing agent comprised mainly of an acrylic ester and was allowed to stand at room temperature for 10 min. Thereafter, the uncured resin present on the surface thereof was removed by dissolving with an organic solvent.

The magnet thus obtained was applied to a thermohygrostatic test (40° C., 95%, 100 hr). In the test, the magnet exhibited an excellent corrosion resistance. (See Table 3.)

TABLE 3

| | Results of Corrosion Resistance Test | | | |
|---|---|---|---|---|
| sample to be tested | magnet prepared in Ex. 5 | magnet in the form of magnet material | magnet having only coating layer | magnet only filled with sealing agent |
| results of thermo-hygro-static test | no corrosion | entire corrosion | partial corrosion | entire corrosion |

EXAMPLE 6

A Nd-B-Fe base magnet produced by sintering was impregnated in vacuo with a sealing agent comprised mainly of an acrylic ester and was allowed to stand at room temperature for 10 min. The uncured resin present on the surface thereof was removed by dissolving with an organic solvent.

Subsequently, the magnet was degreased and washed with trichloroethylene, followed by the formation of metallic titanium coating and titanium nitride coating in a thickness of about 3 μm on the surface of the magnet. Prior to the coating, the surface of the magnet was cleaned in a film forming device by ion bombardment through discharge of an argon gas.

Finally, a coating of poly-p-xylylene (e.g., Parylene manufactured by Union Carbide Corp.) was formed in a thickness of about 5 μm by vacuum deposition.

The magnet thus obtained was applied to a thermohygrostatic test (40° C., 95%, 100 hr). In the test, the magnet exhibited an excellent corrosion resistance. (See Table 4.)

TABLE 4

| | Results of Corrosion Resistance Test | | |
|---|---|---|---|
| sample to be tested | magnet prepared in Ex. 6 | magnet in the form of magnet material | magnet having only coating layer |
| results of thermo-hygro-static test | no corrosion | entire corrosion | partial corrosion |

Having described a specific embodiment of our bearing, it is believed obvious that modification and variation of our invention is possible in flight of the above teachings.

As mentioned above, the present invention enabled the prevention of the penetration of chemicals and water into the magnet from the outside by virtue of the filling of the voids among the grains of the inside of the rare earth-iron base magnet with a sealing agent and, at the same time, enabled the prevention of corrosion by virtue of the formation of a coating layer on the surface thereof. Further, in the present invention, the magnetic characteristics and mechanical strength of the magnet are not spoiled if chemicals which attack the rare earth-iron material are not used.

The term "rare earth-iron magnet" is used herein in a comprehensive sense. That is, the magnet materials may be formed by the melt-quenched amorphous ribbons or sputtered thin films of rare earth-iron alloy. The method of making a rare earth-iron magnet is not restricted to the method shown in example 1.

The melt-quenched ribbons being magnetically isotropic by nature is produced in the following steps; making a starting material, melting the starting material by high-frequency melting, quenching the molten material at a rate such that is solidifies substantially instantaneously to form an alloy with a substantially amorphous to very finely crystalline microstructure. The resulted ribbons is comminuted, and compacted or hot-pressed into a magnet shape. On the other hand, the rare earth-iron magnet produced by sint comminuted, and compacted or hot-pressed into a magnet shape. On the other hand, the rare earth-iron magnet produced by sint comminuted, and compacted or hot-pressed into a magnet shape. On the other hand, the rare earth-iron magnet produced by sintering as shown in example 1 may obtain magnetically anisotropic permanent magnets for the practical purpose. According to the present invention, a sintered magnet having an extremely excellent corrosion resistance can be obtained even though the material of the magnet inherently has a structure full of holes.

What is claimed is:

1. A rare earth iron permanent magnet comprised of compacted Fe-B-R type alloy particles, in which R represents at least one element selected from rare earth elements and Y, a sealing agent filling voids between the compacted Fe-B-R type alloy particles, and a coating layer formed on the outer surface of the permanent magnet, said coating layer being formed by coating the permanent magnet surface wrought in a desired magnet shape.

2. A rare earth-iron permanent magnet according to claim 1, wherein the coating layer comprises a metal layer.

3. A rare earth-iron permanent magnet according to claim 2, wherein the metal layer is composed of two layers which comprise an underlayer of copper plating and an outer layer of nickel plating.

4. A rare earth-iron permanent magnet according to claim 3, wherein the underlayer of copper plating is applied by electroless plating.

5. A rare earth-iron permanent magnet according to claim 1, wherein the coating layer comprises an organic coating.

6. A rare earth-iron permanent magnet according to claim 5, wherein the organic coating comprises poly-p-xylene.

7. A rare earth-iron permanent magnet according to claim 1, wherein the Fe-B-R type alloy consists essentially of, by atomic percent, 8–30% R, 2–28% B and the balance being Fe with impurities.

8. A rare earth-iron permanent magnet according to claim 1, wherein the Fe-B-R type alloy consists essentially of, by atomic percent, 8–30% R, 2–28% B, more than zero and not exceeding 50% Co, and the balance being Fe with impurities.

9. A rare earth-iron permanent magnet according to claim 1, wherein the magnet is a sintered permanent magnet.

10. A rare earth-iron permanent magnet according to claim 1, wherein the coating layer comprises a plasma-polymerized coating.

11. A rare earth-iron permanent magnet according to claim 1, further comprising a sealing agent filling a defective portion of the resulting coating and voids present in the inside of the compacted magnet.

12. A rare earth-iron permanent magnet according to claim 1, wherein the sealing agent is at least one member selected from the group consisting of linseed oil, wax, varnish, water glass, polyester resin, phenolic resin, epoxy resin and anaerobic resin.

13. A permanent magnet comprising: compacted Fe-B-R type alloy particles, wherein R is at least one element selected from the group consisting of rare earth elements and yttrium, wherein voids between particles are sealed by a sealing agent and a coating layer is disposed on the outer surfaces of the permanent magnet, the permanent magnet being produced by providing the particles, compacting the particles to obtain a compact, sintering the compact to obtain a sintered compact, working the sinterd compact to produce a desired permanent magnet shape, filling the voids between the alloy particles with the sealing agent, and coating the outer surfaces thereof with the coating layer.

14. A rare earth-iron permanent magnet according to claim 13, wherein the coating layer comprises a metal layer.

15. A rare earth-iron permanent magnet according to claim 14, wherein the metal layer is composed of two layers which comprise an underlayer of copper plating and an outer layer of nickel plating.

16. A rare earth-iron permanent magnet according to claim 15, wherein the underlayer of copper plating is applied by electroless plating.

17. A rare earth-iron permanent magnet according to claim 13, wherein the coating layer comprises an organic coating.

18. A rare earth-iron permanent magnet according to claim 17, wherein the organic coating comprises poly-p-xylene.

19. A rare earth-iron permanent magnet according to claim 13, wherein the Fe-B-R type alloy consists essentially of, by atomic percent, 8–30% R, 2–28% B and the balance being Fe with impurities.

20. A rare earth-iron permanent magnet according to claim 13, wherein the Fe-B-R type alloy consists essentially of, by atomic percent, 8–30% ron permanent magnet according to claim 13, wherein the Fe-B-R type alloy consists essentially of, by atomic percent, 8–30% R, 2–28% B, more than zero and not exceeding 50% Co, and the balance being Fe with impurities.

21. A rare earth-iron permanent magnet according to claim 13, wherein the coating layer comprises a plasma-polymerized coating.

22. A rare earth-iron permanent magnet according to claim 13, further comprising a sealing agent filling a defective portion of the resulting coating and voids present in the inside of the compacted magnet.

23. A rare earth-iron permanent magnet according to claim 13, wherein the sealing agent is at least one member selected from the group consisting of linseed oil, wax, varnish, water glass, polyester resin, phenolic resin, epoxy resin and anaerobic resin.

24. A rare earth-iron permanent magnet comprised of compacted Fe-B-R type alloy particles, in which R represents at least one element selected from rare earth elements and Y, a sealing agent filling voids between the compacted Fe-B-R type alloy particles, and a coating layer formed on the outer surfaces of the permanent magnet, the magnet being produced by preparing Fe-B-R type alloy particles, compacting the particles to provide a compact, sintering the resulting compact to provide a sintered product, working the sintered product to provide a permanent magnet, filling the voids between the alloy particles, and coating the surfaces of the permanent magnet.

* * * * *